United States Patent
Macdonald et al.

(10) Patent No.: US 11,517,032 B2
(45) Date of Patent: *Dec. 6, 2022

(54) **COMPOSITION COMPRISING *SPIRULINA*-EXTRACT**

(71) Applicant: GNT GROUP B.V., Mierlo (NL)

(72) Inventors: Jane Lee Macdonald, Mierlo (NL); Elena Leeb, Mierlo (NL); Marcus Volkert, Mierlo (NL)

(73) Assignee: GNT GROUP B.V., Mierlo (NL)

(*) Notice: Subject to any disclaimer, the term of this patent is extended or adjusted under 35 U.S.C. 154(b) by 0 days.

This patent is subject to a terminal disclaimer.

(21) Appl. No.: 17/423,559

(22) PCT Filed: Nov. 19, 2019

(86) PCT No.: PCT/EP2019/081806
§ 371 (c)(1),
(2) Date: Jul. 16, 2021

(87) PCT Pub. No.: WO2020/148004
PCT Pub. Date: Jul. 23, 2020

(65) Prior Publication Data
US 2022/0039440 A1    Feb. 10, 2022

Related U.S. Application Data

(60) Provisional application No. 62/794,104, filed on Jan. 18, 2019, provisional application No. 62/794,083, (Continued)

(30) Foreign Application Priority Data

Feb. 11, 2019 (EP) ................................. 19156394
Feb. 11, 2019 (EP) ................................. 19156427
(Continued)

(51) Int. Cl.
A23L 2/58 (2006.01)
A23L 5/46 (2016.01)
(Continued)

(52) U.S. Cl.
CPC .................... *A23L 2/58* (2013.01); *A23L 2/02* (2013.01); *A23L 2/44* (2013.01); *A23L 2/46* (2013.01);
(Continued)

(58) Field of Classification Search
CPC ..... A23L 2/02; A23L 2/68; A23L 2/58; A23L 29/256; A23L 5/46; A23L 2/84; C12G 3/04; A23V 2002/00
(Continued)

(56) References Cited

U.S. PATENT DOCUMENTS

2011/0070336 A1  3/2011  Mutilangi et al.
2015/0201635 A1  7/2015  Graf et al.
2018/0271119 A1  9/2018  Cagnac

FOREIGN PATENT DOCUMENTS

WO    2018134390 A1    7/2018

OTHER PUBLICATIONS

Stone et al. Food Hydrocolloids 27 (2012) 271-277. (Year: 2012).*
(Continued)

*Primary Examiner* — Subbalakshmi Prakash
(74) *Attorney, Agent, or Firm* — Hudak, Shunk & Farine Co. LPA

(57) ABSTRACT

A composition including a. a *spirulina*-extract having phycocyanin, b. at least one multi-sulphated carrageenan and c. water wherein the amount of the phycocyanin is between 0.5 and 50 wt % DM, wherein the amount of the at least one multi-sulphated carrageenan is between 1 and 80 wt % DM, wherein the amount of the water is between 0.1 and 60 wt %, wherein the wt % ratio of carrageenan to phycocyanin ranges between 1:1 and 20:1, wherein the wt % DM are
(Continued)

relative to the weight of the dry matter of the composition, and wherein wt % is relative to the total weight of the composition. A foodstuff containing the above composition.

18 Claims, 3 Drawing Sheets

Related U.S. Application Data filed on Jan. 18, 2019, provisional application No. 62/794,094, filed on Jan. 18, 2019, provisional application No. 62/794,074, filed on Jan. 18, 2019.

(30) Foreign Application Priority Data

Feb. 11, 2019 (EP) ..................................... 19156440
Feb. 11, 2019 (EP) ..................................... 19156444

(51) Int. Cl.
| | |
|---|---|
| *A23L 29/256* | (2016.01) |
| *A23L 2/02* | (2006.01) |
| *A23L 2/68* | (2006.01) |
| *A23L 2/84* | (2006.01) |
| *C12G 3/04* | (2019.01) |
| *A23L 29/231* | (2016.01) |
| *A23L 2/44* | (2006.01) |
| *A23L 2/46* | (2006.01) |

(52) U.S. Cl.
CPC ..................................... *A23L 2/68* (2013.01); *A23L 2/84* (2013.01); *A23L 5/46* (2016.08); *A23L 29/231* (2016.08); *A23L 29/256* (2016.08); *C12G 3/04* (2013.01); *A23V 2002/00* (2013.01)

(58) Field of Classification Search
USPC .... 426/61, 250, 573, 575, 577, 652, 55, 520
See application file for complete search history.

(56) References Cited

OTHER PUBLICATIONS

CN102058007A machine translation (Year: 2011).*

Buchweitz, "Natural Solutions for Blue Colors in Food", Handbook on Natural Pigments in Food and Beverages, 2016, pp. 355-384, vol. 17, Woodhead Publishing.
Singh, "Kinetics of acid hydrolysis of κ-carrageenan as determined by molecular weight (SEC-MALLSRI), gel breaking strength, and viscosity measurements", Carbohydrate Polymers, 1994, pp. 89-103, vol. 23, Elsevier Science Limited.
Yoshikawa, "Single-Laboratory Validation of a Method for the Determination of c-Phycocyanin and Allophycocyanin in Spirulina (Arthrospira) Supplements and Raw Materials by Spectrophotometry", Journal of AOAC International, 2008, pp. 524-529, vol. 91, No. 3.
Selig Michael J et al: Protection of blue color in a spirulina derived physocyanin extract from proteolytic and thermal degradation via complexation with beet-pectin, Food Hydrocolloids, Jul. 28, 2017, pp. 46-52, vol. 74, Elsevier BV, NL.
Eko Nuracahya et al: Physical Properties of Spirulina Phycocyanin Microencapsulated with Maltodextrin and Carrageenan, Philippine Journal of Science, Jun. 1, 2018, pp. 201-207, vol. 147, Philippines.
Ratana Chaiklahan et al: Stability of phycocyanin extracted from *Spirulina* sp: Influence of temperature PH and preservatives, Process Biochemistry, Apr. 1, 2012, pp. 659-664, vol. 47, No. 4 Elsevier Ltd.
Giulia Martelli et al: "Thermal stability improvement of blue colorant C-phycocyanin from Spirulina platensis for food industry applicators", Process Biochemistry, Jan. 1, 2014, pp. 154-159, vol. 49 No. 1, Elsevier Ltd.
Prajapati Vipul D et al: "Carrageenan: A natural seaweed polysaccharide and its applications", Carbohydrate Polymers, Jan. 30, 2014, pp. 97-112, vol. 105, Elsevier Ltd.
Jespersen et al: "Heat and light stability of three natural blue colorants for use in confectionery and beverages", European Food Research and Technology, Springer Berlin Heidelberg, Mar. 1, 2005, pp. 261-266 vol. 220, No. 304, Springer-Verlag.
Sonda Benelhadj et al: "Effect of pH on the functional properties of Arthrospira (Spirulina) platensis protein isolate", Food Chemistry, Aug. 31, 2015, pp. 1056-1063, vol. 194, Elsevier Ltd.
Dewi et al:"Physical Characteristics of Phycocyanin from Spirulina Microcapsules using Different Coating Materials with Freeze Drying Method", 2nd Int'l Conf. Tropical and Coastal Region Eco Dev., 2016, IOP Conf Series: Earth and Envirn. Sci 55, 2017, 012060, IOP Publishing Ltd.

* cited by examiner

COMPOSITION COMPRISING *SPIRULINA*-EXTRACT

FIELD OF THE INVENTION

The present invention relates to a composition comprising a *spirulina*-extract which can yield stable colored food stuff, across wide pH range and after thermal treatment.

BACKGROUND OF THE INVENTION

Colored foodstuff is known in the art. Also, *spirulina*-extracts are well known in the art, and used to add nutritional value to food stuff, and optionally to add color to foodstuff. The blue pigment of *spirulina*, for example *Spirulina platensis* (synonym for *Arthrospira platensis*) is the protein phycocyanin.

Examples of foodstuff are beverages, syrups, confectionary, fruit preps, gelatins, puddings, salad dressings, soups, jams, etc.

Beverages and colored beverages are known in the art. The use of natural food pigments over synthetic ones has increased in the food industry, due to increased consumer demands. While several natural pigments have been applied to beverages, there is a need for a stable natural blue pigment which can be used on its own or blended with other pigments to deliver a range of colors including but not limited to green, purple, brown, and black.

US2018271119 discloses the use of an acid-pH-resistant phycocyanin derived from *Galdieria sulphuraria*, which is capable of growing at both high temperature and low pH, for use in acidic compositions. The increased acid stability of phycocyanin (and allophycocyanin) extracted from *Galdieria sulphuraria* might be explained by the differences in the amino acid sequence in comparison to phycocyanin from commercially available *spirulina* (such as *Arthrospira platensis, Arthrospira maxima*, etc.) But *Galdieria sulphuraria* phycocyanin extracts have not yet been approved or undergone long term testing, as *Spirulina* derived phycocyanin has.

Selig, et al. *Food Hydrocolloids,* 74, 46-52, (2017) discloses the use of beet-pectin to stabilize phycocyanin from a *spirulina*-extract at pH 6.8 in an aqueous solution.

Dewi, et al. *IOP Conf. Ser.: Earth Environ. Sci.* 55 (2017) discloses a *spirulina*-extract encapsulated in K-carrageenan for use in an aqueous solution.

Phycocyanin, from *Spirulina* and its extract, is to-date the only natural blue pigment approved by the US-FDA (FR Doc No: 2013-19550) and European Union as a coloring food. It is sold in liquid or in powder form for use as blue color in foods. Phycocyanin, however, has the disadvantage of being unstable in aqueous systems, leading to precipitation/aggregation and subsequent turbidity increase and/or sediment formation, loss of color intensity and/or change of color hue which limits the use of phycocyanin as natural pigment. Thus, phycocyanin is restricted in its use for its food coloring properties in acidic beverages, such as in for example carbonated or non-carbonated drinks, which can be acidic.

In addition to the negative impact of acidic foodstuff conditions, it is also a challenge to stabilize the color intensity and color hue of phycocyanin containing foodstuffs against thermal treatment. Thermal treatment is a common manufacturing process before filling bottles with foodstuff to secure microbiological safety of the foodstuff. In case of cold filling of bottles, preservatives are added. However, both stabilizing approaches influence the stability of phycocyanin: the color of the foodstuff tends to fade away quickly after thermal treatment and/or the addition of preservatives.

Hence, there is a need to stabilize phycocyanin at both acidic and neutral pH.

SUMMARY OF THE INVENTION

The inventors have found a solution to stabilize the blue color, from a phycocyanin containing *spirulina*-extract, in acidic compositions, and to improve the heat stability of phycocyanin containing foodstuffs and/or the stability in the presence of preservatives.

The present invention relates to a composition comprising a. a *spirulina*-extract comprising phycocyanin, b. at least one multi-sulphated carrageenan and c. water wherein the amount of the phycocyanin is between 0.5 and 50 wt % DM, the amount of the at least one multi-sulphated carrageenan is between 1 and 80 wt % DM, the amount of the water is between 0.1 and 60 wt %, wherein the wt % ratio of multi-sulphated carrageenan to phycocyanin ranges between 1:1 and 20:1, and wherein the wt % DM are relative to the weight of the dry matter of the composition, and wherein wt % is relative to the total weight of the composition.

The dry matter of the composition is the weight of the composition excluding water.

The invention increases color stability of *spirulina* extracts in foodstuffs over the heating process as well as storage duration and solves one or more of the compounding negative effects of acidic conditions and heat treatment on the blue color. The negative effects are increase in turbidity, aggregation/precipitation, color fading, color hue changes and might be present directly after processing or develop over storage duration (weeks or months), as foodstuffs need to withstand long transport and varying storage conditions.

Advantages of the composition according to the invention are color stability against heat treatment and prevention of aggregation/precipitation; thereby enabling acidic and natural foodstuffs to be colored with blue *spirulina*-extracts; for example, in blue and blue-based colored beverages.

DETAILED DESCRIPTION OF THE INVENTION

Figure 1:
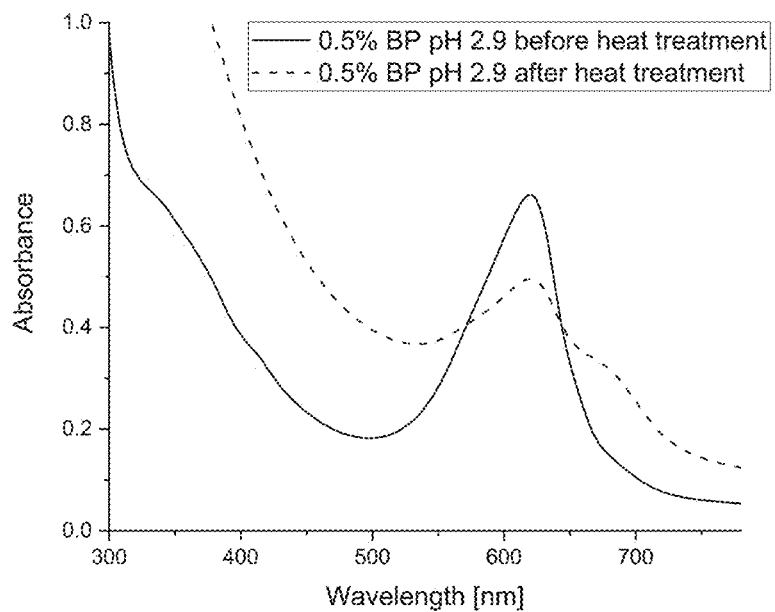
FIG. 1: Reference example heat treatment; Absorbance spectra of control sample (pH 2.9 and 0.5% EXBERRY® 60000002) before and after thermal treatment.

The composition of the invention contains a phycocyanin containing *spirulina*-extract, multi-sulphated carrageenan, water and optionally other components.

The other components may be for example carriers, sweeteners, chelating agents, acids, proteins, other pigments, additives and preservatives.

The composition according to the invention may have a blue color due to the phycocyanin content, but other colors based on blue may be obtained by way of mixing other pigments in with the composition.

The composition preferably has a water content between 0.1 and 60 wt %, or between 0.1 and 50 wt %.

In one embodiment the composition is a dry powder or granule, and the water content is between 0.1 and 15.0 wt %, preferably between 3.0 and 12.0 wt %.

In another embodiment, the composition is a liquid and the water content ranges between 15.0 and 60.0 wt %, preferably between 15.0 and 50.0 wt % or more preferably between 20.0 and 45.0 wt %.

The water content was determined by an infrared Moisture Analyzer (MA35, Sartoius). The measure principle relies on an infrared dryer and internal balance that detects the moisture loss along the drying of the sample at 103° C. As the change in weight approaches zero the analysis is stopped and the water content is displayed.

Preferably the total amount of phycocyanins, multi-sulphated carrageenan and water in the composition is at least 7 wt %, more preferably at least 10 wt %, even more preferably at least 20 wt %.

The pH of the composition is preferably between 5 and 9, more preferably between 5.5 and 8.5, or between 6 and 8.

The composition's color can be required to be stable over a long period of time (through transport and storage over weeks or months). The color also needs to be stable in a food product made with the composition of the invention when subject to high temperature, up to 120° C., as these temperatures are commonly used in the food industry in processes such as high temperature short time pasteurization to ensure food safety.

Phycocyanin

The composition contains a phycocyanin containing *spirulina*-extract. *Spirulina* belongs to the phylum cyanobacteria and contains beside the blue phycobiliproteins also other proteins, carbohydrates, lipids, fiber and amongst others, minerals. The phycocyanin containing *spirulina*-extract can be a water extract of several different cyanobacteria, for example *Arthrospira platensis* and *Arthrospira maxima*. The phycobiliproteins comprise C-phycocyanin and allophycocyanin. Phycocyanins exhibit the blue color of the compositions according to the present invention. The total phycocyanin content (which is the sum of the C-phycocyanin and allophycocyanin) in the composition according to the present invention containing *spirulina*-extract ranges between 0.5 and 50 wt % DM, preferably between 1 and 30 wt % DM, more preferably between 5 and 25 wt % DM, or between 10 and 20 wt % DM.

In one embodiment the composition is a dry powder or granule and the total phycocyanin content (which is the sum of the C-phycocyanin and allophycocyanin) ranges between 1 and 50 wt %, preferably between 1.5 and 25 wt %, more preferably between 7 and 23 wt %, relative to the total weight of the dry powder or granule.

In another embodiment, the composition is a liquid with a phycocyanin content between 1 and 15 wt %, preferably between 2 and 10 wt %, most preferably between 3 and 8 wt %, relative to the weight of the liquid composition.

Multi-Sulphated Carrageenan

The composition contains at least one multi-sulphated carrageenan or a combination of multi-sulphated carrageenans.

Carrageenans are sourced from seaweed and they are highly flexible molecules that can form curling helical structures. Carrageenans are characterized as linear polysaccharides with repeating galactose units.

Carrageenans are classified by the degree of sulphonation. Examples of mono-sulphated carrageenans are κ-carrageenan, γ-carrageenan and α-carrageenan. Examples of di-sulphated carrageenans are ι-carrageenan, δ-carrageenan, μ-carrageenan and θ-carrageenan. Examples of tri-sulphated carrageenans are λ-carrageenan and ν-carrageenan. Multi-sulphated carrageenans are carrageenans containing at least 2 sulphate groups, preferably 2 or 3 sulphate groups per disaccharide unit.

In some embodiments the multi-sulphated carrageenan can be a non-degraded carrageenan.

In some embodiments the multi-sulphated carrageenan can be a hydrolyzed carrageenan, preferably by a thermal treatment of a non-degraded multi-sulphated carrageenan under acidic pH conditions.

Thermal treatment of carrageenan solutions at acidic pH leads to a hydrolysis of the glycosidic bonds ($\alpha$(1-3) and $\beta$(1-4) bonds) connecting the alternating D-galactose residues. Thus, the average molecular weight was shown to decrease with increasing hydrolysis duration (Singh & Jacobsson, 1994). In addition, a good correlation of the measured viscosity and the molecular weight was observed, meaning that with decreasing molecular weight the viscosity decreases (Singh & Jacobsson, 1994). Preferably the pH is between 1.4 and 4 and preferably the temperature is between 20-98° C. for hydrolysis of the glycosidic bonds, more preferably between 55 and 98° C.

Due to the uniform backbone structure, the concentration of carrageenan can be quantified by the content of galactose. In addition, the quantification of galactose allows to determine if the glycosidic bond or also the galactose monomer unit gets degraded by the hydrolysis conditions.

A possibility to quantify galactose is the quantification of monosaccharides after acid hydrolysis. Hydrolysis of carrageenan is performed with 72% sulphuric acid ($H_2SO_4$) for 30 min at 30° C., followed by further hydrolysis after dilution to 6% sulphuric acid ($H_2OS_4$) for 3 hours at 100° C. The amount of monosaccharides rhamnose, galactosamine, arabinose, glucosamine, galactose, glucose, mannose, xylose, galacturonic acid and glucuronic acid in the hydrolysate can be quantitatively analyzed by High Performance Anion Exchange Chromatography with Pulsed Amperometric Detection (HPAEC-PAD) on a gold electrode. Analyses are performed with a ICS-5000 DP pump, AS-AP autosampler, DC column compartment and ED electrochemical detector (Thermo Scientific). The neutral monosaccharides are eluted using a gradient of 18 mM sodium hydroxide and 200 mM sodium hydroxide with 75 mM sodium acetate. Data analysis is done with Chromeleon software version 7.2 (Thermo Scientific). Quantitative analyses are carried out using standard solutions of the monosaccharides (Sigma-Aldrich).

The content of galactose in commercially available carrageenan products can vary, due to the molecular composition of different carrageenan classes and the purity of the product. Analysis of the galactose content of the used lambda carrageenan powders revealed a galactose content between 49 and 55%. Quantification of the galactose content in hydrolyzed carrageenan solutions showed comparable galactose contents as related to the initial amounts of used carrageenan powder. These results demonstrate that a hydrolysis of carrageenan at pH ≥1.5 and temperatures ≤95° C. result in the hydrolysis of the glycosidic bonds but do not degrade the galactose unit itself.

In addition, the degree of sulphonation can be quantified by the amount of Sulphur. A possibility to quantify Sulphur is based on the combustion of the sample at temperatures above 1000° C. and reduction of the released Sulphur to Sulphur dioxide (Elementar Vario Max Cube). The amount of Sulphur is quantified by an IR detector which is calibrated using a calibration curve of sulfadiazine.

The viscosity of the carrageenan solutions was characterized by viscometry using an Anton Paar Rheometer MCR 302 (Switzerland). Flow curves were measured with a shear rate (1/s) range from 1 to 300 (linear increase within 25 min) at 20° C. To compare different carrageenan solutions, the viscosity at a shear rate of 100/s is used.

The preferred multi-sulphated carrageenans of the invention are ι-carrageenan, δ-carrageenan, μ-carrageenan, θ-carrageenan, λ-carrageenan and ν-carrageenan, the hydrolysed products of ι-carrageenan, δ-carrageenan, μ-carrageenan, θ-carrageenan, λ-carrageenan and ν-carrageenan; more preferred are ι-carrageenan and λ-carrageenan, and its hydrolyzed products and most preferred is λ-carrageenan and hydrolyzed λ-carrageenan.

Mixtures of multi-sulphated carrageenans can also be used.

The multi-sulphated carrageenans to be used in the present invention have preferably a viscosity between 1 and 3000 mPas, when dissolved as a 4 wt % solution in water at a pH of 5.5.

The multi-sulphated carrageenans of the invention stabilize the color of the phycocyanin in foodstuff against heat treatment across the full pH range and also stabilize the color over time (weeks, for example 6 weeks or more at 32° C.), while mono-sulphated carrageenans work in a limited pH range and do not have the effect of color stabilization over time.

The multi-sulphated carrageenan content of the composition is between 1 and 80 wt % DM, preferably between 5 and 70 wt % DM, more preferably between 10 and 55 wt % DM, most preferably between 15 and 40 wt % DM.

The multi-sulphated carrageenans and phycocyanin from a *spirulina*-extract are preferably present within the composition at a weight ratio between 1:1-20:1, preferably between 2:1-15:1, more preferably between 2.5:1-10:1, most preferably between 2.6:1-8:1.

Color

It is known that the food characteristics (as pH, ionic strength, etc.) might affect the configuration of phycocyanin and consequently impacts color hue. As pH decreases and the equilibrium of phycocyanin is shifted to monomers, the color hue shifts from dark blue to blue green (Buchweitz, 2016). In general, at pH values of 3.9 and less the equilibrium of phycocyanin is shifted to monomers.

The color performance of the invented product in a food application is assessed using hue measurements and the total sum of blue absorbance.

The color hue is measured using a spectrophotometer and a CIE L*a*b* value is calculated. Colorimeter measurements provide a numerical representation of color based upon Opponent Color Theory where CIE L*a*b* represents (CIELAB color space):
L* scale: Light vs. Dark where a low number (0-50) indicates Dark and a high number (51-100) indicates Light.
a* scale: Red vs Green where a positive number indicates Red and a negative number indicates Green.
b* scale: Yellow vs. Blue where a positive number indicates Yellow and a negative number indicates Blue.

$$\Delta E = \sqrt{(L_1^* - L_0^*)^2 + (a_1^* - a_0^*)^2 + (b_1^* - b_0^*)^2}$$

ΔE is the overall measure of color difference.

In acidic conditions, it is hypothesized that negatively charged multi-sulphated carrageenan, like for example lambda and iota carrageenan, form complexes with positively charged phycocyanins and prevents it from aggregating and stabilizes the color. A clear shift in color hue is observed with the addition of multi-sulphated carrageenan, like for example iota and lambda carrageenan, in acidic conditions. Table A shows the difference in color hue measured by spectrophotometer and represented as CIE L*a*b* at various pHs with and without lambda carrageenan at 0.05 wt %, *spirulina*-extract EXBERRY® Shade Blue Powder 60000002 at 0.5 wt % (0.012% phycocyanin), sucrose at 7 wt %, citric acid varying from 0-0.266 wt % to reach desired pH, and remaining balance is water.

A pH 6.5, there is no change in color hue when lambda carrageenan is added. The ΔE between control and variant at pH 6.5 is 1.0 which indicates no difference in color hue. Between pH 2.6-4.0, the ΔE value is greater than 10 which indicates a significant shift in color. The addition of carrageenan shifts the color hue to be lighter (higher L*) and less blue/more yellow (higher b*).

TABLE A

Measured CIE L*a*b* values for a beverage model system at various pH and without and with the addition of 0.05 wt % lambda carrageenan

| | CONTROL | | | VARIANT (0.05 wt % lambda carrageenan) | | | |
|---|---|---|---|---|---|---|---|
| | L* | a* | b* | L* | a* | b* | ΔE |
| pH 6.5 | 77.12 | −19.03 | −32.24 | 76.44 | −18.24 | −32.36 | 1.0 |
| pH 4.0 | 66.68 | −23.33 | −18.36 | 85.69 | −17.81 | −15.01 | 20.1 |
| pH 3.5 | 70.16 | −19.45 | −21.44 | 88.92 | −16.48 | −9.66 | 22.4 |
| pH 2.9 | 80.13 | −19.39 | −20.04 | 89.65 | −16.21 | −7,47 | 16.1 |
| pH 2.6 | 83.6 | −19.14 | −15.66 | 89.64 | −14.77 | −4.15 | 13.7 |

A method for the phycocyanin quantification was validated by Yoshikawa C Belay (2008). The amount of native phycocyanin (mg/mL) can be calculated from photometric measurements of a dilution in pH 6.0 buffer. It relies upon absorbance measurements at 620 and 650 nm and the extinction coefficients of C-phycocyanin and allophycocyanin at these wavelengths and defined pH. The total phycocyanin content in a *spirulina*-extract can be calculated according to the following equations:

$$\text{allophycocyanin}\left(\frac{mg}{mL}\right) = $$
$$0.180(\text{Abs } 650 \text{ nm} - \text{Abs } 750 \text{ nm}) - 0.042(\text{Abs } 620 \text{ nm} - \text{Abs } 750 \text{ nm})$$

$$\text{C-phycocyanin}\left(\frac{\text{mg}}{\text{mL}}\right) =$$
$$0.162(\text{Abs } 620 \text{ nm} - \text{Abs } 750 \text{ nm}) - 0.098(\text{Abs } 650 \text{ nm} - \text{Abs } 750 \text{ nm})$$

$$\text{Total phycocyanin}\left(\frac{\text{mg}}{\text{mL}}\right) = \text{allophycocyanin}\left(\frac{\text{mg}}{\text{mL}}\right) + \text{C phycocyanin}\left(\frac{\text{mg}}{\text{mL}}\right)$$

Figure 4:
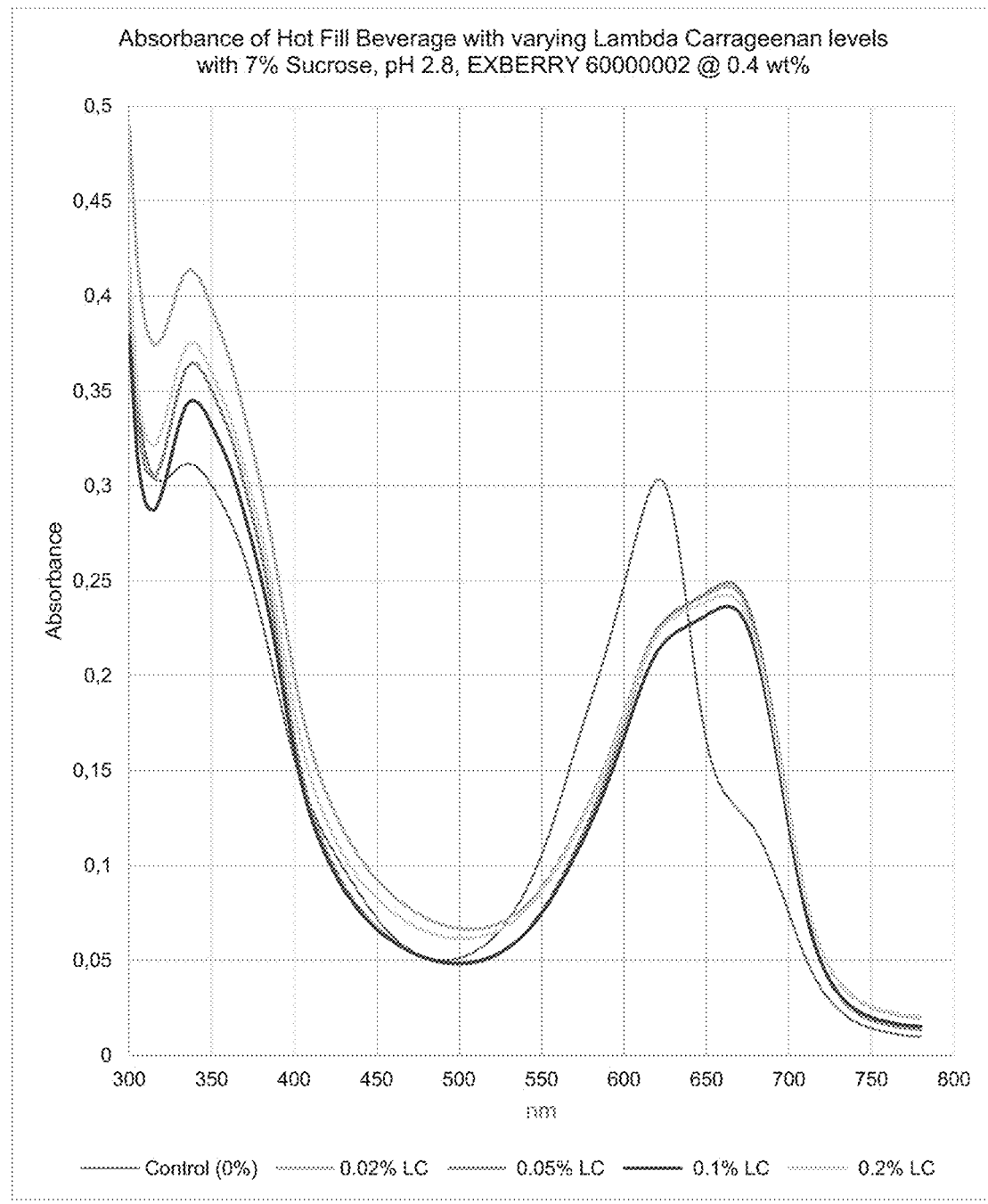
FIG. 4: Photometric analysis of beverage model system (pH 2.8) without and with the addition of 0.02-0.2 wt % A-carrageenan. The shape of the curve and shift of the visible peak maximum to 660-670 nm stayed consistent with each dosage level of A-carrageenan. The shift in the photometric curve was surprising and suggests that λ-carrageenan is forming a complex with the phycocyanin in acidic conditions.

The addition of multi-sulphated carrageenan changes the shape of the characteristic phycocyanin peak at acidic pH and in some cases, the peak maximum shifts from 620 nm to between 660-670 nm (see for example FIG. 4). Calculating phycocyanin content according to Yoshikawa & Belay (2008) using only absorbance measurements at 620 and 650 nm would underestimate phycocyanin content for solutions containing multi-sulphated carrageenan in acidic conditions. Thus, to determine the magnitude of color retention, the sum of the blue absorbance measurements at $A_{620\ nm}-A_{750\ nm}$; $A_{650\ nm}-A_{750\ nm}$ and $A_{667\ nm}-A_{750\ nm}$ are calculated and used by equation:

Total sum of blue absorbance=$(A_{620\ nm}-A_{750\ nm})$+ $(A_{650\ nm}-A_{750\ nm})+(A_{667\ nm}-A_{750\ nm})$ To determine the amount of phycocyanin added to a composition, the dosage level of phycocyanin containing *spirulina*-extract is multiplied by the total phycocyanin content in the phycocyanin containing *spirulina*-extract.

The challenge with phycocyanin containing *spirulina*-extracts is the application to acidified aqueous systems and/or color stability of a food stuff after thermal treatment. For example, phycobiliproteins precipitate out of solution when the pH is between 2.7 and 6.0. Precipitation may occur immediately or after a few weeks and this is dependent upon factors such as the viscosity, ionic strength, order of addition, and pH of the solution. Precipitation can be delayed when the solution is in a gel or semi-solid form. The aggregation/precipitation as well as separation of aggregated proteins is assessed visually. High absorbance at 750 nm after acidification, thermal processing and/or addition of preservatives indicates a strong potential for protein aggregation/precipitation.

In the invented composition phycocyanin and multi-sulphated carrageenans are present as homogeneous mixture. It is believed that the phycocyanin and multi-sulphated carrageenan form a complex, at least when diluted in acidic aqueous systems.

This hypothesis is supported by the changes in color hue (table 1) and shifts in the absorbance maximum of the photometric measurement (see FIG. 4). Therefore, the composition of the present invention preferably shows an additional peak at ~667 nm.

Other Components

The composition may contain other components. The other components typically can be any one of diluents, carrier materials, sweeteners, stabilizers, chelating agents, acids, salts, proteins, flavors, vitamins, minerals, other pigments, additives and preservatives.

Examples for carrier materials can be different kind of polysaccharides, such as maltodextrin, alginate, chitosan, starch.

Examples of sweeteners are invert sugar, sucrose, high fructose corn syrup, corn syrup, fructose, glucose, trehalose, lactose, honey, agave.

Examples of pigments are safflomin (safflower), anthocyanin, carotenoid, betanin, bixin (annatto), lycopene, curcumin and chlorophyll. The pigments may be added to the blue colored *spirulina*-extract to blend into other colors, such as for example green using safflomin.

Examples of preservatives are salts, sorbic acid, benzoic acid, natamycin, nisin and sulfites.

Examples of salts are ionic compounds that can be formed with the positively charged cation such as calcium, magnesium, potassium, sodium, or copper with salt forming anions like for example acetate, carbonate, chloride, citrate, oxide, phosphate, sorbate, benzoate, hexametaphosphate or sulfate.

Examples of acids are phosphoric, citric, lactic, malic, adipic, tartaric, sodium acid pyrophosphate.

Chelators, or chelating agents, are binding agents that influence the chemical and/or physical state of the molecules/atoms they bind by forming chelates. Chelators can improve color retention and have been found to work synergistically with the multi-sulphated carrageenans.

Chelating agents can be synthetic and natural compounds and include the group of ethylene diamine tetra acetic acid and/or its Na, K, Ca salts (EDTA), L-glutamic acid N,N-diacetic acid tetrasodium salt (GLDA), sodium hexametaphosphate, glutathione, metallotheionein, 2,3-dimerapto-1-propanesulfonic acid, *chlorella*, garlic, cilantro, selenium, milk thistle, vitamin C, vitamin E, citrates, grape seed extract, quercetin, and lipoic acid.

The chelating agents are preferably selected from the group of ethylene diamine tetra acetic acid and/or its Na, K, Ca salts (EDTA) and L-glutamic acid N,N-diacetic acid tetrasodium salt (GLDA). EDTA is considered to be ethylene diamine tetra acetic acid together with its Na, K, Ca salts, like for example calcium disodium ethylenediamlnetetraacetate, disodium ethylenediaminetetraacetate, tetrasodium ethylenediaminetetraacetate, dipotassium ethylenediaminetetraacetate, and tripotassium ethylenediaminetetraacetate.

Calcium disodium ethylenediaminetetraacetate is abbreviated to $CaNa_2$ EDTA, disodium ethylenediaminetetraacetate is abbreviated to $Na_2$ EDTA, tetrasodium ethylenediamlnetetraacetate is abbreviated to $Na_4$ EDTA, dipotassium ethylenediamlnetetraacetate is abbreviated to $K_2$ EDTA, and tripotassium ethylenediaminetetraacetate is abbreviated to $K_3$ EDTA.

In one embodiment, a chelating agent is preferably present between 10-100,000 ppm in the composition.

1 ppm of chelating agent is to be understood as 0.0001 wt %; for example, 100 ppm of EDTA are 0.01 wt %.

EDTA is preferably present between 100-20,000 ppm, preferably 500-15,000 ppm, most preferably 1000-10,000 ppm. The EDTA and phycocyanin from the *spirulina*-extract can be present within the composition for example at a weight ratio between 4:1-1:1000, preferably between 1:1-1:500, most preferably 1:5-1:100.

The multi-sulphated carrageenans in combination with a chelator such as EDTA showed a surprisingly high increase in color retention and extended shelf life after thermal treatment and/or use of preservatives. The effect of EDTA is the most pronounced in the presence of preservatives, and/or after thermal processing below a pH 2.7 or above a pH of 3.2.

Process

The invented composition can be obtained according to a process comprising the following steps:

a) Aqueous extraction of phycocyanin from *Arthrospira platensis* and separation of undesired components, like solids, from and concentration of the extract to obtain a phycocyanin containing *spirulina*-extract;

b) Dilution of at least one multi-sulphated carrageenan until it occurs in dissolved form;

c) Blending of the phycocyanin containing *spirulina*-extract with the solution of at least one multi-sulphated carrageenan to a weight ratio of multi-sulphated carrageenan to phycocyanin between 1:1-20:1, preferably between 2:1-15:1, more preferably between 2.5:1-10:1, most preferably between 2.6:1-8:1 at a pH of at least 5, preferably at a pH between 5 and 10;
d) Optional addition of other components such as carrier materials, sweeteners, chelating agents, acids, other pigments, additives and preservatives
e) Removal of water by applying evaporation or drying technology In step a) a phycocyanin containing *spirulina* extract is obtained. The amount of phycocyanin typically ranges between 8 and 60 wt % DM.

In step b), the at least one multi-sulphated carrageenan is diluted with water. The dilution typically contains between 3 and 5 wt % carrageenan and between 95 and 97 wt % water. Optionally a thermal treatment of the dissolved carrageenan can be realized at acidic pH to reduce the viscosity of the solution. The carrageenan is dissolved, when the solution is clear to the eye and no turbidity is observed.

In step c) the pH of the multi-sulphated carrageenan solution needs to be controlled to have a pH ≥5.0. Preferably the pH is between 5 and 10 The addition of optional other components (step d) can be combined with step b), provided that the addition of the optional components does not decrease the pH of the multi-sulphated carrageenan solution below pH 5.0. Examples of additional components that can be combined in step b) are sweeteners and some carrier materials.

In step e) drying or concentrating of the extract can be applied either to obtain a dry powder product, having between 0.1 and 15 wt % water, or to obtain a liquid composition having a low water content, for example between 15 and 60 wt % water, respectively. Examples of suitable drying techniques are freeze drying, spray drying, drum drying or vacuum drum drying.

Multi-sulphated carrageenans are linear polysaccharides with repeating sulphated galactose units. The glycosidic linkages between galactose units are subject to hydrolysis with heat and acid. Non-degraded and hydrolyzed multi-sulphated carrageenan will stabilize phycocyanin, however, the multi-sulphated carrageenan must be neutralized to a pH above 5.0 prior to complexing with phycocyanin. Both hydrolyzed and non-hydrolyzed multi-sulphated carrageenan should have a pH above 5.0 prior to the addition of phycocyanin to prevent precipitation.

The invention also relates to the use of the composition according to the present invention and to a foodstuff comprising the composition according to the present invention.

The foodstuff may contain between 0.001 and 50 wt % of the composition, preferably between 0.02 and 40 wt % of the composition according to the invention.

Phycocyanin from *spirulina*-extracts is known to lose its color when applied to acidic food systems or due to thermal processing of the food. Foodstuffs are typically transported and stored before being consumed. To assure that the colored foodstuffs do not spoil and are safe for consumption, either thermal processes, preservatives, or combination of both are used.

A considerable blue color loss is observed upon thermal treatment such as high temperature short time (for example 120° C. for 6 seconds) processing and when preservatives are used for solutions without carrageenans.

The multi-sulphated carrageenans, also in combination with a chelator such as EDTA showed a surprisingly high increase in color retention and extended shelf life after thermal treatment and/or use of preservatives.

The foodstuff containing the composition according to the present invention can be obtained according to a process comprising the following steps:
a) Adding and dissolving the composition according to the present invention, comprising phycocyanin and at least one multi-sulphated carrageenan.
b) Adding an acid or acidifying component;
c) Optionally adding a sweetener, flavor, vitamin, mineral, salt, buffer, juice, or other beverage components;
d) Optionally adding a chelating agent, such as EDTA;
e) Optionally adding other pigments, such as anthocyanins;
f) Optionally adding an additive, such as preservatives;
g) Adding solvents to obtain the total volume, such as water and alcohol;
h) Treating the mixture of a)-g) by either thermally processing the liquid to at least 65'C and filling it into a container; or no thermal treatment and cold filling into a container, or combinations of the two.

It is noted that the invention relates to all possible combinations of features described herein, preferred in particular are those combinations of features that are present in the claims. It will therefore be appreciated that all combinations of features relating to the composition according to the invention; all combinations of features relating to the process according to the invention and all combinations of features relating to the composition according to the invention and features relating to the process according to the invention are described herein.

It is further noted that the term 'comprising' does not exclude the presence of other elements. However, it is also to be understood that a description on a product/composition comprising certain components also discloses a product/composition consisting of these components. The product/composition consisting of these components may be advantageous in that it offers a simpler, more economical process for the preparation of the product/composition. Similarly, it is also to be understood that a description on a process comprising certain steps also discloses a process consisting of these steps. The process consisting of these steps may be advantageous in that it offers a simpler, more economical process.

The invention is now elucidated by way of the following examples, without however being limited thereto.

REFERENCES

Buchweitz, M. (2016). 17—Natural Solutions for Blue Colors in Food. In R. Care, & R. M. Schweiggert (Eds.), *Handbook on Natural Pigments in Food and Beverages* (pp. 355-384): Woodhead Publishing.

Dewi, E. N. et al. (2017). "Physical characteristics of phycocyanin from *Spirulina* microcapsules using different coating materials with freeze drying method", *IOP Conf. Ser.: Earth Environ. Sci.* 55.

Selig, M. J., et al., (2017). "Protection of blue color in a *spirulina* derived phycocyanin extract from proteolytic and thermal degradation via complexation with beet-pectin", *Food Hydrocolloids*, 74, 46-52.

Singh, Satish K. and Jacobsson, Sven P. (1996). Kinetics of acid hydrolysis of K-carrageenan as determined by molecular weight (SEC-MALLSRI), gel breaking strength, and viscosity measurements. *Carbohydrate Polymers*, 23, 89-103.

Yoshikawa, N., & Belay, A. (2008). Single-Laboratory Validation of a Method for the Determination of c-Phycocyanin and Allophycocyanin in *Spirulina (Arthrospira)*

Supplements and Raw Materials by Spectrophotometry. *Journal of AOAC International*, 91, 524-529.

EXAMPLE

Example 1.1: Freeze-Dried *Spirulina* Extract-Lambda Carrageenan Powder

Lambda carrageenan (Ticaloid® 750, Lot Number 41145 from TIC GUMS) was dissolved in demineralized water with a concentration of 4 wt %. To enable a fast dissolution of lambda carrageenan the water was tempered to 40° C. and the powder was incorporated via an Ultra-Turrax overhead stirrer. After cooling down the solution to ambient temperature (20° C.) liquid *spirulina* extract was added.

To achieve a lambda carrageenan to phycocyanin wt ratio of 3.7, the 4 wt % lambda carrageenan solution was blended with a *spirulina* water extract with a phycocyanin concentration of 3.25 wt % in a ratio of 4 to 1. The mixture had a pH of 6.8 and was frozen at −18° C. and subsequent freeze dried for 72 h at 0.045 mbar (Alpha 1-4, Christ). The dried powder contained 18.3 wt % phycocyanin and 68.3 wt % lambda carrageenan. The remaining amounts are colorless water-soluble components of the *spirulina* biomass and a residual water of 10.6 wt %. The phycocyanin content was calculated according to Yoshikawa & Belay (2008) and is given in table 1. The L*a*b* values were determined for the freeze-dried powder, diluted in phosphate buffer (pH 7.0) to an absorbance of 1.0 at 620 nm.

TABLE 1

Phycocyanin content and L*a*b* values of a freeze-dried powder with a lambda carrageenan to phycocyanin ratio of 3.7

| | Total phycocyanin [mg/ml] | L* | a* | b* |
|---|---|---|---|---|
| Freeze-dried spirulina extract—lambda carrageenan powder | 183.4 | 71.1 | −19.0 | −39.5 |

Example 1.2: Spray Dried *Spirulina* Extract-Lambda Carrageenan Powder

Lambda carrageenan (Ticaloid® 750, Lot Number 41145 from TIC GUMS) was dissolved in demineralized water with a concentration of 4 wt %. To enable a fast solution of the lambda carrageenan the water was tempered to 40° C. and the powder was incorporated via an Ultra-Turrax overhead stirrer. After cooling down the solution to ambient temperature (20° C.) liquid *spirulina* extract was added.

To achieve a lambda carrageenan to phycocyanin ratio of 4.3, the 4 wt % lambda carrageenan solution was blended with an aqueous *spirulina* extract with a phycocyanin concentration of 2.8 wt % In a ratio of 4 to 1. The mixture has a pH of 7.6 and was subsequent spray dried with an outlet temperature of 78° C. The dried powder contained 15.8 wt % phycocyanin and 67.8 wt % lambda carrageenan. The remaining amounts of the powder are colorless water-soluble components of the *spirulina* biomass and residual water of 9.0 wt %. The phycocyanin content was calculated according to Yoshikawa & Belay (2008) and the L*a*b* values were determined for a dilution of the spray-dried powder in phosphate buffer (pH 7.0) to an absorbance of 1.0 at 620 nm (see table 2).

TABLE 2

Phycocyanin content and L*a*b* values of a freeze-dried powder with a lambda carrageenan to phycocyanin ratio of 4.3

| | Total phycocyanin [mg/ml] | L* | a* | b* |
|---|---|---|---|---|
| Spray-dried spirulina extract—lambda carrageenan powder | 157.9 | 71.4 | −19.2 | −39.7 |

Example 1.3: Protective Effects of Multi-Sulphated Carrageenan on the Color Stability of Phycocyanin

Example 1.3.1: Color Stability of *Spirulina* Extract Powder in a Beverage Model System The positive effect of multi-sulphated carrageenan on the color stability and aggregation/precipitation of phycocyanin was evaluated in a beverage application. As reference a beverage model system that contained 7 wt % sucrose, 0.5 wt % *spirulina*-extract EXBERRY® Shade Blue Powder 60000002 (0.012 wt % phycocyanin) and citric acid to adjust the pH to 2.9 was prepared. The beverage solution was thermally processed to 85° C. for 10 s and filled hot into PET bottles and cooled in a water bath to less than 35° C.

Photometric curves of the beverage before and after thermal processing are given in FIG. 1. Table 3 gives the L*a*b* values, as well as different absorbance characteristics of the beverage before and after thermal treatment as well as after accelerated storage conditions at 32° C. for 3 and 6 weeks.

The acidic pH as well as the thermal treatment lead to an aggregation/precipitation of proteins and thus increase in turbidity (see FIG. 1). Furthermore, a high loss of color (measured as total sum of blue absorbance) was observed along accelerated storage and 41% of the initial value were determined after 6 weeks.

TABLE 3

Characteristics of control sample (pH 2.9 and 0.5% EXBERRY ® 60000002) before and after thermal treatment as well as after accelerated storage conditions at 32° C. for 3 and 6 weeks

| | L* | a* | *b | A 620 nm- A 750 nm | A 650 nm- A 750 nm | A 667 nm- A 750 nm | Total sum of blue abs | % Total sum of blue abs |
|---|---|---|---|---|---|---|---|---|
| Control pH 2.9 0.5% BP BH | 74.24 | −20.71 | −11.66 | 0.60051 | 0.26911 | 0.13467 | 1.00429 | 100.00 |

TABLE 3-continued

Characteristics of control sample (pH 2.9 and 0.5% EXBERRY ® 60000002) before and after thermal treatment as well as after accelerated storage conditions at 32° C. for 3 and 6 weeks

| | L* | a* | *b | A 620 nm-A 750 nm | A 650 nm-A 750 nm | A 667 nm-A 750 nm | Total sum of blue abs | % Total sum of blue abs |
|---|---|---|---|---|---|---|---|---|
| Control pH 2.9 0.5% BP AH | 69.00 | −11.91 | 12.10 | 0.35240 | 0.23330 | 0.19668 | 0.78238 | 77.90 |
| Control pH 2.9 0.5% BP AH & 3 weeks storage at 32° C. | 68.69 | −7.04 | 16.31 | 0.2682 | 0.1690 | 0.1353 | 0.5725 | 57.01 |
| Control pH 2.9 0.5% BP AH & 6 weeks storage at 32° C. | 74.73 | −5.81 | 13.47 | 0.2018 | 0.1199 | 0.0923 | 0.414 | 41.22 |

BP: EXBERRY ® Shade Blue Powder 60000002;
BH: before heat-treatment,
AH: after heat-treatment Example 1.3.2: Color Stability of Freeze-Dried Spirulina Extract-Lambda Carrageenan Powder in a Beverage Model System In addition a phycocyanin containing spirulina-extract was blended with a lambda-carrageenan solution in a ratio of phycocyanin to multi-sulphated carrageenan of 1:3.7. The mixture was further freeze dried (see example 1) and contained 18.3 wt % phycocyanin and 68.3 wt % lambda carrageenan. An appropriate amount of the freeze-dried powder was added to the beverage model system prior to the pH adjustment. To get an initial phycocyanin content of 0.012 wt %, 0.065% of the powder was needed and citric acid was used to adjust the pH to 2.9.

Figure 2:
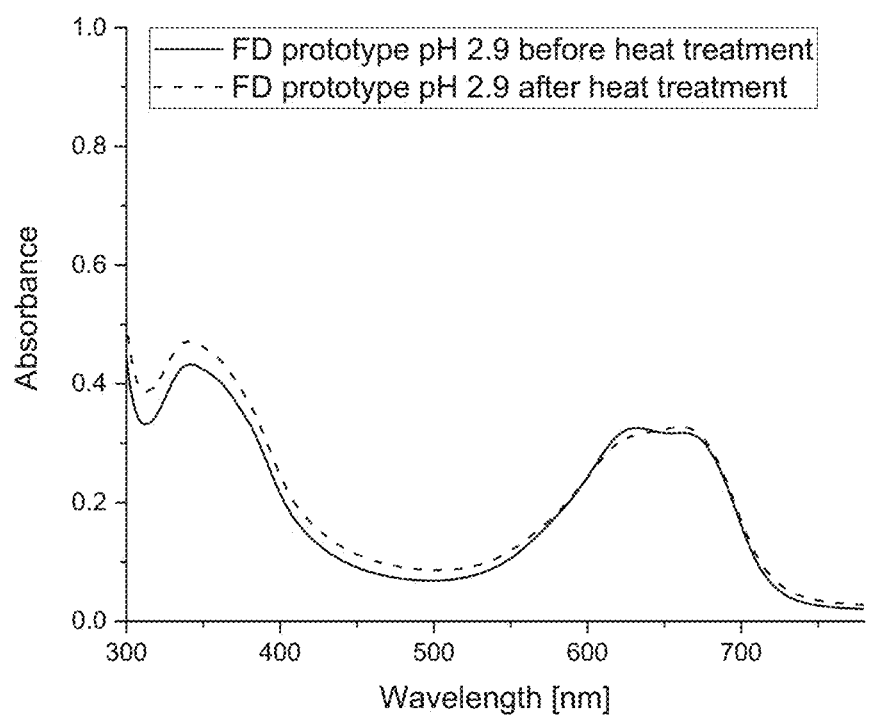
FIG. 2: Absorbance spectra of a beverage model system (pH 2.9) with a freeze-dried *spirulina* extract lambda carrageenan powder before and after thermal treatment (FD: freeze-dried).

FIG. 2 shows the photometric curves of the beverage before and after thermal processing. Table 4 gives the L*a*b* values, as well as the absorbance at 620, 650 and 667 nm as well as the calculated total sum of blue absorbance.

TABLE 4

Characteristics of a beverage system (pH 2.9) with a freeze-dried spirulina extract-lambda carrageenan powder before and after thermal treatment as well as after accelerated storage at 32° C. for 3 and 6 weeks

| | L* | a* | *b | A620 nm-A750 nm | A650 nm-A750 nm | A667 nm-A750 nm | Total sum of blue abs | % Total sum of blue abs |
|---|---|---|---|---|---|---|---|---|
| Beverage pH 2.9 with freeze-dried spirulina extract-lambda carrageenan powder BH | 88.16 | −15.97 | −6.66 | 0.28686 | 0.29046 | 0.28913 | 0.86645 | 100.00 |
| Beverage pH 2.9 with freeze-dried spirulina extract-lambda carrageenan powder AH | 87.34 | −14.96 | −5.03 | 0.26589 | 0.28829 | 0.29012 | 0.84430 | 97.44 |
| Beverage pH 2.9 with freeze-dried spirulina extract-lambda carrageenan powder AH & 3 weeks storage at 32° C. | 88.51 | −12.87 | −5.37 | 0.23174 | 0.24514 | 0.24514 | 0.72202 | 83.33 |

TABLE 4-continued

Characteristics of a beverage system (pH 2.9) with a freeze-dried spirulina extract-lambda carrageenan powder before and after thermal treatment as well as after accelerated storage at 32° C. for 3 and 6 weeks

|  | L* | a* | *b | A620 nm-A750 nm | A650 nm-A750 nm | A667 nm-A750 nm | Total sum of blue abs | % Total sum of blue abs |
|---|---|---|---|---|---|---|---|---|
| Beverage pH 2.9 with freeze-dried spirulina extract-lambda carrageenan powder AH & 6 weeks storage at 32° C. | 90.03 | −11.04 | −5.56 | 0.19906 | 0.20436 | 0.20366 | 0.60708 | 70.07 |

Abs: Absorbance;
BH: before heat-treatment,
AH: after heat-treatment

As can be seen from Table 3 and 4 a change in the color hue is detectable in the presence of lambda carrageenan at acidic conditions. In addition, the absorbance curve shifts and a second absorbance maximum between 660 and 670 nm is detectable. Furthermore, the presence of lambda carrageenan stabilized the color stability over the heat-treatment. Only ~3% loss of color (measured as total sum of blue absorbance) and no precipitation/aggregation of proteins was detectable. In addition, the presence of lambda carrageenan stabilized the color over storage of 3 and 6 weeks at 32° C. and a remaining total sum of blue absorbance of 83% and 70% was determined instead of 57% and 41% for the reference (example 3.1).

Example 1.3.3: Color Stability of Spray-Dried *Spirulina* Extract Lambda Carrageenan Powder in a Beverage Model System Furthermore, a phycocyanin containing *spirulina*-extract was blended with a lambda-carrageenan solution in a ratio of phycocyanin to multi-sulphated carrageenan of 1:4.3. The mixture was spray-dried (see example 2) and contained 15.8 wt % phycocyanin and 67.8 wt % lambda carrageenan. An appropriate amount of the spray-dried powder was added to the beverage model system (containing 7 wt % sucrose) prior to the pH adjustment. To get an initial phycocyanin content of 0.012 wt %, 0.076 wt % of the powder was needed and citric acid was used to adjust the pH to 2.9.

Figure 3:
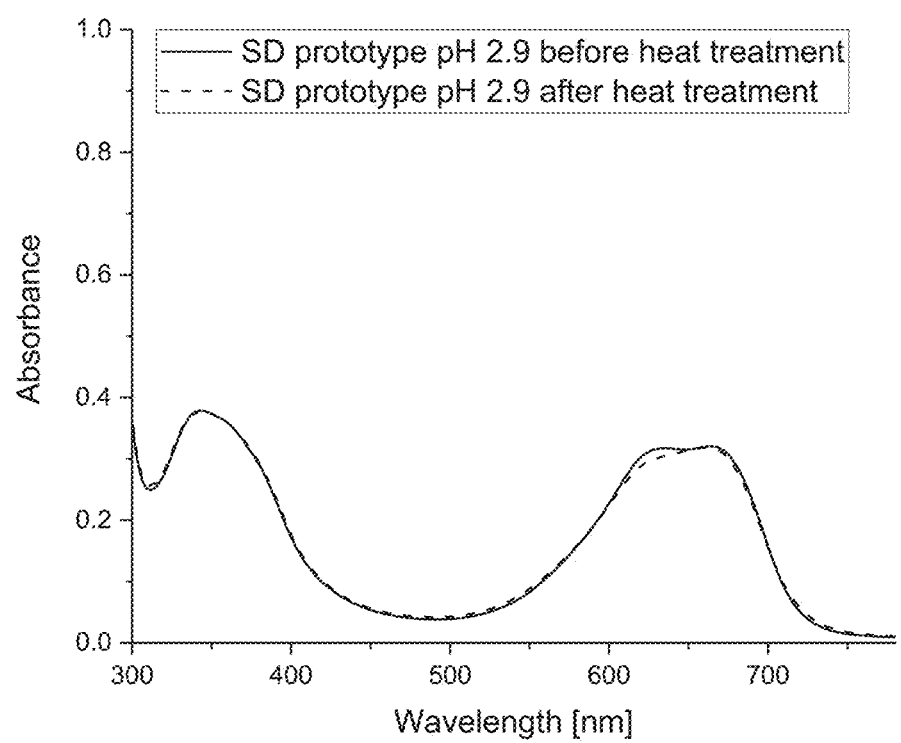
FIG. 3: Absorbance spectra of a beverage system (pH 2.9) with spray-dried *spirulina* extract lambda carrageenan powder before and after thermal treatment.

FIG. 3 shows the photometric curves of the beverage before and after thermal processing. Table 5 gives the L*a*b* values, the absorbance at 620, 650 and 667 nm as well as the calculated total sum of blue absorbance.

TABLE 5

Characteristics of a beverage system (pH 2.9) with spray-dried spirulina extract lambda carrageenan powder before and after thermal treatment

|  | L* | a* | *b | A620 nm-750 nm | A650 nm-A750 nm | A667 nm-A750 nm | Total sum of blue abs | % Total sum of blue abs |
|---|---|---|---|---|---|---|---|---|
| Beverage pH 2.9 with spray-dried spirulina extract-lambda carrageenan powder BH | 89.97 | −16.47 | −8.8 | 0.28794 | 0.30094 | 0.30542 | 0.89430 | 100.00 |
| Beverage pH 2.9 with spray-dried spirulina extract-lambda carrageenan powder AH | 89.79 | −15.51 | −8.7 | 0.27039 | 0.29649 | 0.29884 | 0.86572 | 96.80 |
| Beverage pH 2.9 with spray-dried spirulina extract-lambda carrageenan powder AH & 3 weeks storage at 32° C. | 90.4 | −13.3 | −8.3 | 0.23519 | 0.25019 | 0.25059 | 0.73597 | 82.30 |

TABLE 5-continued

Characteristics of a beverage system (pH 2.9) with spray-dried spirulina extract lambda carrageenan powder before and after thermal treatment

| | L* | a* | *b | A620 nm-750 nm | A650 nm-A750 nm | A667 nm-A750 nm | Total sum of blue abs | % Total sum of blue abs |
|---|---|---|---|---|---|---|---|---|
| Beverage pH 2.9 with spray-dried spirulina extract-lambda carrageenan powder AH & 6 weeks storage at 32° C. | 91.15 | −11.42 | −7.6 | 0.20316 | 0.20896 | 0.20796 | 0.62008 | 69.34 |

Abs: absorbance,
BH: before heat-treatment,
AH: after heat-treatment

As can be seen from table 3 and 5 a change in the color hue is detectable in the presence of lambda carrageenan at acidic conditions. In addition, the absorbance curve shifts and a second absorbance maximum between 660 and 670 nm is detectable (see FIG. 3). Furthermore, the presence of lambda carrageenan stabilized the color stability over the heat-treatment. Only ~3% loss of color (measured as total sum of blue absorbance) and no precipitation/aggregation of proteins was detectable. In addition, the presence of lambda carrageenan stabilized the color over storage of 3 and 6 weeks at 32° C. and a remaining sum of total blue absorbance of 82% and 69% was determined instead of 57% and 41% for the reference (example 3.1).

Experiment 2.1: Freeze-Dried Spirulina Extract-Lambda Carrageenan Powder with a pH of 3

Lambda Carrageenan (Ticaloid® 750, Lot Number 41145 from TIC GUMS) was dissolved in demineralized water with a concentration of 4 wt %. To enable a fast dissolution of lambda carrageenan the water was tempered to 40° C. and the powder was incorporated via an Ultra-Turrax overhead stirrer. After cooling down the solution to ambient temperature (20° C.) liquid spirulina extract was added.

To achieve a lambda carrageenan to phycocyanin wt ratio of 3.7, the 4 wt % lambda carrageenan solution was blended with a spirulina extract with a phycocyanin concentration of 3.25 wt % in a ratio of 4 to 1. The mixture had a pH of 6.8 and was adjusted to pH 3 with citric acid. The decrease of the pH induced the complexation of spirulina extract proteins and lambda carrageenan (see L*a*b* values in table 6). However, due to the high concentration of spirulina extract proteins and lambda carrageenan precipitation occurred. The mixture was frozen at −18° C. and subsequent freeze dried for 72 h at 0.045 mbar (Alpha 1-4, Christ). The dried powder contained 68.3 wt % lambda carrageenan and a phycocyanin content of 8.75% was determined according to Yoshikawa & Belay (2008). The remaining amounts are insoluble and colorless phycocyanin as well as other water-soluble components of the spirulina biomass and 7.5 wt % residual water. In contrast to example 1 no complete dissolution of the freeze-dried powder was achievable. Even after stirring of the solution for 12 hours insoluble precipitates remain and lead to a high turbidity.

TABLE 6

Phycocyanin content and L*a*b* values of a freeze-dried powder with a lambda carrageenan to phycocyanin ratio of 3.7 and a pH of 3.0

| | Total phycocyanin [mg/ml] | L* | a* | b* |
|---|---|---|---|---|
| Freeze-dried spirulina extract—lambda carrageenan (pH 3.0) powder | 87.45 | 62.46 | −17.07 | −27.52 |

Experiment 2.2: Color Stability of Freeze-Dried Spirulina Extract-Lambda Carrageenan Powder with a pH of 3.0 in a Beverage Model System The freeze-dried spirulina extract lambda carrageenan powder was added to the beverage model system with 7 wt % prior to the pH adjustment. To get an initial phycocyanin content of 0.012 wt %, 0.145 wt % of the powder was needed and citric acid was used to adjust the pH to 2.9. Even though the system was stirred for 6 hours insoluble particles were visible and remained also after the heat treatment.

Table 7 gives the L*a*b* values, as well as the absorbance at 620, 650 and 667 nm as well as the calculated total sum of blue absorbance.

TABLE 7

Characteristics of a beverage system (pH 2.9) with a freeze-dried spirulina extract-lambda carrageenan powder with pH 3.0 before and after thermal treatment as well as after accelerated storage at 32° C. for 3 and 6 weeks

| | L* | a* | *b | A620 nm-A750 nm | A650 nm-A750 nm | A667 nm-A750 nm | Total sum of blue abs | % Total sum of blue abs |
|---|---|---|---|---|---|---|---|---|
| Beverage pH 2.9 with freeze-dried spirulina extract- | 43.78 | −10.31 | 17.94 | 0.5135 | 0.5181 | 0.512632 | 1.544232 | 100.00 |

TABLE 7-continued

Characteristics of a beverage system (pH 2.9) with a freeze-dried spirulina extract-lambda carrageenan powder with pH 3.0 before and after thermal treatment as well as after accelerated storage at 32° C. for 3 and 6 weeks

|  | L* | a* | *b | A620 nm-A750 nm | A650 nm-A750 nm | A667 nm-A750 nm | Total sum of blue abs | % Total sum of blue abs |
|---|---|---|---|---|---|---|---|---|
| lambda carrageenan powder with pH 3 BH |  |  |  |  |  |  |  |  |
| Beverage pH 2.9 with freeze-dried spirulina extract-lambda carrageenan powder with pH 3 AH | 48.25 | −13.26 | 17.32 | 0.5092 | 0.5244 | 0.522217 | 1.555817 | 100.75 |
| Beverage pH 2.9 with freeze-dried spirulina extract - lambda carrageenan powder with pH 3 AH & 3 weeks storage at 32° C. | 63.13 | −11.55 | 15.16 | 0.3358 | 0.3373 | 0.3332 | 1.0063 | 65.17 |
| Beverage pH 2.9 with freeze-dried spirulina extract-lambda carrageenan powder with pH 3 AR & 6 weeks storage at 32° C. | 78.1 | −11.14 | 7.37 | 0.2379 | 0.237 | 0.2349 | 0.7098 | 45.96 |

Abs: absorbance;
BH: before heat-treatment,
AH: after heat-treatment

As can be seen from table 4 and 6 a change in the color hue of the foodstuff is detectable if the *spirulina* extract-lambda carrageenan solution was adjusted to pH 3.0 prior to the freeze drying. In addition, the decrease in the pH led to the formation of insoluble particles that formed a sediment in the beverage model system. Even though the presence of lambda carrageenan stabilized the color stability over the heat-treatment the high precipitation/aggregation of proteins also along the storage duration makes this composition inappropriate for its use in a foodstuff.

Example 3.1: Freeze Dried *Spirulina* Extract-Lambda Carrageenan-EDTA Powder

EDTA and lambda carrageenan (Ticaloid® 750, Lot Number 41145 from TIC GUMS) were dissolved in demineralized water with a concentration of 600 ppm and 4 wt %, respectively. To enable a fast solution of the components the water was tempered to 40° C. and the powders were incorporated via an Ultra-Turrax overhead stirrer. After cooling down the solution to ambient temperature (20° C.) a liquid *spirulina* extract with a phycocyanin concentration of 2.8 wt % was added in a ratio of 4 to 1. The mixture has a pH of 5.1 and was frozen at −18° C. and subsequent freeze dried for 72 h at 0.045 mbar (Alpha 1-4, Christ). The dried powder contained 12.7 wt % color active phycocyanin and 62.7 wt % lambda carrageenan. The remaining amounts of the powder are colorless and water-soluble components of the *spirulina* biomass, EDTA and residual water of 7.9 wt %.

The phycocyanin content was calculated according to Yoshikawa & Belay (2008) and the L*a*b* values were determined for a dilution of the freeze-dried powder in phosphate buffer (pH 7.0) to an absorbance of 1.0 at 620 nm (see table 8).

TABLE 8

Phycocyanin content and L*a*b* values of a freeze-dried powder with a lambda carrageenan to phycocyanin ratio of 5:1 and a EDTA concentration of 12,540 ppm

|  | Total phydocyanin [mg/ml] | L* | a* | b* |
|---|---|---|---|---|
| Freeze-dried spirulina extract—lambda carrageenan EDTA powder | 126.6 | 71.49 | −19.08 | −40.35 |

Example 3.2: Color Stability of Freeze-Dried *Spirulina* Extract-Lambda Carrageenan EDTA Powder in a Beverage Model System The freeze-dried powder was added to a beverage model system (containing 7 wt % sucrose) prior to the pH adjustment. To get an initial phycocyanin content of 0.012 wt %, 0.095 wt % of the powder was needed. This dilution brought up a EDTA concentration of ~12 ppm in the beverage model system. Citric acid was used to adjust the pH to 2.9.

TABLE 9

Characteristics of a beverage system (PH 2.9) with a freeze-dried spirulina extract-lambda carrageenan EDTA powder and after thermal treatment before

|  | L* | a* | *b | A 620 nm-A 750 nm | A650 nm-A 750 nm | A667 nm-A 750 nm | Total sum of blue abs | % Total sum of blue abs |
|---|---|---|---|---|---|---|---|---|
| Beverage pH 2.9 with freeze-dried spirulina extract-lambda carrageenan EDTA powder BH | 81.49 | −11.33 | 1.25 | 0.2212 | 0.2188 | 0.2100 | 0.5983 | 100.00 |
| Beverage pH 2.9 with |  |  |  |  |  |  |  |  |

TABLE 9-continued

Characteristics of a beverage system (PH 2.9) with a freeze-dried spirulina extract-lambda carrageenan EDTA powder and after thermal treatment before

| | L* | a* | *b | A 620 nm- A 750 nm | A650 nm- A 750 nm | A667 nm- A 750 nm | Total sum of blue abs | % Total sum of blue abs |
|---|---|---|---|---|---|---|---|---|
| freeze-dried spirulina extract-lambda carrageenan powder AH | 79.28 | −9.68 | 2.83 | 0.2044 | 0.2164 | 0.2170 | 0.2212 | 98.12 |
| Beverage pH 2.9 with freeze-dried spirulina extract-lambda carrageenan EDTA powder AH & 3 weeks storage at 32° C. | 89.58 | −11.12 | −5.02 | 0.1987 | 0.2082 | 0.2091 | 0.1944 | 94.76 |
| Beverage pH 2.9 with freeze-dried spirulina extract-lambda carrageenan EDTA powder AH & 6 weeks storage at 32° C. | 90.51 | −10 | −5.54 | 0.1852 | 0.1882 | 0.1887 | 0.1987 | 86.50 |

Abs: absorbance,
BH: before heat-treatment,
AH: after heat-treatment

As can be seen from table 3 and 9 a change in the color hue is detectable in the presence of lambda carrageenan and EDTA at acidic conditions. Furthermore, the presence of lambda carrageenan and EDTA stabilized the color stability over the heat-treatment. Surprisingly the addition of EDTA improved the protective effect of the hydrocolloid and only 2% loss of color (measured as total sum of blue absorbance) and no precipitation/aggregation of proteins was detectable. In addition, the presence of lambda carrageenan and EDTA stabilized the color over storage of 3 and 6 weeks at 32° C. and a remaining sum of total blue absorbance of 95% and 87% was determined instead of 83% and 70% for lambda carrageenan only (see Table 4).

Experiment 4.1: Liquid *Spirulina* Extract-Hydrolyzed Lambda Carrageenan Composition As the viscosity of carrageenan solutions drastically increase with increasing carrageenan concentration, the processing (i.a. pumpability) of liquid *spirulina* extract-lambda carrageenan compositions become difficult. A possibility to reduce the viscosity of carrageenan solutions is the breakdown of the linear polysaccharides. Experiments were carried out to investigate how acid hydrolysis of carrageenan reduces its viscosity and if hydrolysis has an influence on its protective effect on blue color. Viscosity was measured by Anton Paar Rheometer with a shear rate (1/s) range from 1 to 300 (linear increase within 25 min) at 20° C.

Therefore, carrageenan was hydrolyzed at various pH, temperature and heating durations to realize different viscosities. For this purpose, acidified water was heated to the target temperature (60.0, 77.5, 95.0° C.). Lambda carrageenan powder (Ticaloid® 750, TIC GUMS) was added to acidified water (to obtain a 4 wt % solution of carrageenan in water) and stirred with an Ultra Turrax overhead stirrer at 600 rpm to enable a solution of the powder and simultaneous hydrolysis, whereas the temperature was kept constant. The amount of citric acid to adjust a pH of 1.5, 2.5 and 3.5 in the 4 wt % lambda-carrageenan solution was evaluated prior to the hydrolysis in individually experiments. The reaction was stopped by cooling down the solution to 4° C. in an ice bath. Table 10 gives an overview on the viscosity of non-hydrolyzed carrageenan solution (initial pH is 9.8), and the viscosity of hydrolyzed carrageenan solutions before and after pH increase to 5.5 in dependence of the hydrolysis parameter.

TABLE 10

Influence of pH, temperature and hydrolysis duration on the viscosity of lambda carrageenan (4 wt %)

| Temperature [° C.] | pH | Duration [min] | Viscosity* [mPas] | Viscosity* after neutralization (pH 5.5) [mPa · s] |
|---|---|---|---|---|
| 20 | 9.8 | 0 | 2224 | — |
| 20 | 1.5 | 0 | 1168 | — |
| 60 | 1.5 | 60 | 47 | 36 |
| 60 | 1.5 | 10 | 339 | 410 |
| 77.5 | 1.5 | 35 | 3 | 4 |
| 60 | 2.5 | 35 | 507 | 471 |
| 77.5 | 2.5 | 10 | 191 | 190 |
| 77.5 | 2.5 | 35 | 39 | 32 |
| 95 | 2.5 | 35 | 3 | 3 |
| 60 | 3.5 | 60 | 1521 | 1429 |
| 77.5 | 3.5 | 35 | 636 | 616 |
| 95 | 3.5 | 60 | 19 | 18 |
| 95 | 3.5 | 10 | 356 | 342 |

*Viscosity determined at a shear rate of 100/s

The viscosity of a 4 wt % carrageenan solution was decreased by decreasing the pH. In addition, concurrent heat-treatment drastically reduced the viscosity, whereas the viscosity is depending on the temperature, pH and duration of hydrolysis (see Table 10).
The pH after neutralization was pH 5.5. The viscosity of the solution after neutralization with 2M NaOH solution was also measured and the viscosity of the solutions did not increase to original viscosity levels which demonstrates that viscosity drop is due to hydrolysis of multi-sulphated carrageenan and not a function of pH.

All the above listed hydrolyzed carrageenan solutions were used to prepare a blend with *spirulina* extract to verify the effect of hydrolysis on the protective effect of carrageenan. In this experiment, the solutions were not concentrated to a dry matter of at least 40 wt % which is necessary for commercial food safety but instead the dilute solutions were used as is to demonstrate proof of principal. The examples of table 11 can be further dried to at least a 40 wt % DM keeping the protective effect which is demonstrated in example 5.

Mixtures were prepared, wherein the initial lambda carrageenan to PC ratio is 5:1, or 10:1 (Table 11). To enable a homogenous distribution and prevent the formation of carrageenan-protein complexes (as described in experiment 2.1) the pH of the hydrolyzed lambda carrageenan was increased to 5.5 prior to the addition of the *spirulina* extract. Only for one exception the pH of the hydrolysate was not increased and kept at pH 2.5. As a result, a particle formation occurred.

The phycocyanin content of the liquid *spirulina* extract-hydrolyzed lambda carrageenan solutions was determined by the method of Yoshikawa and Belay (2008) and is given in Table 11. The L*a*b* values were determined for the liquid composition, diluted in phosphate buffer (pH 7.0) to an absorbance of 1.0 at 620 nm.

TABLE 11

Characteristics, phycocyanin content and L*a*b* values of liquid spirulina extract-hydrolyzed lambda carrageenan solutions

| Hydrolysis conditions | LC:PC-Ratio | pH of Hydrolysat | Appearance | Total phycocyanin [mg/ml] | L* | a* | b* |
|---|---|---|---|---|---|---|---|
| pH 1.5, 60° C., 60 min | 5:1 | 5.5 | homogeneous | 5.99 | 71.36 | −20.46 | −38.97 |
| pH 1.5, 60° C., 10 min | 5:1 | 5.5 | homogeneous | 5.52 | 71.21 | −20.41 | −39.10 |
| pH 1.5, 77.5° C., 35 min | 5:1 | 5.5 | homogeneous | 5.89 | 71.78 | −20.34 | −39.81 |
| pH 2.5, 77.5° C., 10 min | 5:1 | 5.5 | homogeneous | 5.86 | 70.59 | −20.52 | −37.59 |
| pH 2.5, 77.5° C., 10 min | 5:1 | 2.5 | Particle formation | 5.15 | 70.01 | −18.38 | −38.59 |
| pH 2.5, 77.5° C., 10 min | 10:1 | 5.5 | homogeneous | 3.11 | 71.46 | −20.43 | −39.48 |
| pH 2.5, 60° C., 35 min | 5:1 | 5.5 | homogeneous | 5.70 | 71.3 | −20.31 | −39.18 |
| pH 2.5, 77.5° C., 35 min | 5:1 | 5.5 | homogeneous | 5.91 | 7.1 | −20.37 | −38.85 |
| pH 2.5, 95° C., 35 min | 5:1 | 5.5 | homogeneous | 5.85 | 71.17 | −20.25 | −38.83 |
| pH 3.5, 60° C., 60 min | 5:1 | 5.5 | homogeneous | 5.82 | 71.23 | −20.22 | −39.19 |
| pH 3.5, 77.5° C., 35 min | 5:1 | 5.5 | homogeneous | 5.68 | 71.22 | −20.33 | −38.91 |
| pH 3.5, 95° C., 10 min | 5:1 | 5.5 | homogeneous | 5.71 | 71.19 | −20.37 | −38.62 |
| pH 3.5, 95° C., 60 min | 5:1 | 5.5 | homogeneous | 5.69 | 71.35 | −20.29 | −39.11 |

The dry matter content of the prepared compositions as described in Table 11 was determined to be between 4.4 and 4.9%. To investigate the protective effect of carrageenan in its hydrolyzed form, the liquid *spirulina* extract-hydrolyzed lambda carrageenan composition with low brix was used to prepare a blue beverage with low pH (example 4.2). Furthermore, the water content of liquid *spirulina* extract-hydrolyzed lambda carrageenan compositions with low brix can be reduced by evaporation (example 5) and/or drying to increase the stability over storage.

Example 4.2: Color Stability of a Liquid *Spirulina* Extract-Hydrolyzed Lambda Carrageenan Solutions in a Beverage Model System The liquid *spirulina*-extract-hydrolyzed lambda-carrageenan solutions (see table 11) were added to a beverage model system (containing 7 wt % sucrose) prior to the pH adjustment. Appropriate amount of the liquid *spirulina* extract-hydrolyzed lambda carrageenan solutions were used to get an initial phycocyanin content of ~0.012 wt %. Citric acid was used to adjust the pH of the beverage system to 2.9. Table 12 shows the characteristics of the *spirulina* extract-hydrolyzed carrageenan solutions as well as the total sum of blue absorbance before and after thermal treatment in the beverage application, as well as the remaining color along storage at 32° C.

TABLE 12

Characteristics of a beverage system (pH 2.9) with liquid spirulina-extract-hydrolyzed lambda carrageenan compositions before and after thermal treatment and along storage

| Hydrolysis conditions | LC:PC-ratio | pH of Hydrolysate | Total sum of blue abs-BH | Total sum of blue abs-BH [%] | Total sum of blue abs-AH [%] | Total sum of blue abs-AH 3 weeks [%] | Total sum of blue abs-AH 6 weeks [%] |
|---|---|---|---|---|---|---|---|
| pH 1.5, 60° C., 60 min | 5:1 | 5.5 | 0.7927 | 100 | 97 | 79 | 70 |
| pH 1.5, 60° C., 10 min | 5:1 | 5.5 | 0.7989 | 100 | 96 | 80 | 70 |

TABLE 12-continued

Characteristics of a beverage system (pH 2.9) with liquid spirulina-extract-hydrolyzed lambda carrageenan compositions before and after thermal treatment and along storage

| Hydrolysis conditions | LC:PC-ratio | pH of Hydrolysate | Total sum of blue abs-BH | Total sum of blue abs-BH [%] | Total sum of blue abs-AH [%] | Total sum of blue abs-AH 3 weeks [%] | Total sum of blue abs-AH 6 weeks [%] |
|---|---|---|---|---|---|---|---|
| pH 1.5, 77.5° C., 35 min | 5:1 | 5.5 | 0.7820 | 100 | 97 | 78 | 63 |
| pH 2.5, 60° C., 35 min | 5:1 | 5.5 | 0.8215 | 100 | 101 | 84 | 75 |
| pH 2.5, 77.5° C., 10 min | 5:1 | 5.5 | 0.7774 | 100 | 103 | 86 | 77 |
| pH 2.5, 77.5° C., 10 min | 5:1 | 2.5 | 0.0112 | particles | particles | particles | particles |
| pH 2.5, 77.5° C., 10 min | 10:1 | 5.5 | 0.7872 | 100 | 103 | 85 | 79 |
| pH 2.5, 77.5° C., 35 min | 5:1 | 5.5 | 0.8073 | 100 | 103 | 84 | 76 |
| pH 2.5, 95° C., 35 min | 5:1 | 5.5 | 0.7932 | 100 | 100 | 86 | 77 |
| pH 3.5, 60° C., 60 min | 5:1 | 5.5 | 0.8099 | 100 | 103 | 87 | 78 |
| pH 3.5, 77.5° C., 35 min | 5:1 | 5.5 | 0.7754 | 100 | 101 | 74 | 61 |
| pH 3.5, 95° C., 60 min | 5:1 | 5.5 | 0.7951 | 100 | 104 | 84 | 75 |
| pH 3.5, 95° C., 10 min | 5:1 | 5.5 | 0.8054 | 100 | 101 | 86 | 76 |

Abs: absorbance;
BH: before heat-treatment;
AH: after heat-treatment

As can be seen from Table 12, also hydrolyzed lambda carrageenan stabilized the color over the heat-treatment. The only exception was detectable for the mixture, where the pH of the hydrolysate was not adjusted to pH 5.5. The formed particles within this spirulina extract-hydrolyzed lambda carrageenan solution were insoluble, resulting in low color values (measured as total sum of blue absorbance) and the presence of particles in the beverage. If the pH of the hydrolysate was increased prior to the addition of spirulina extract and depending on the hydrolysis conditions no color loss or only ~4% loss of color (measured as total sum of blue absorbance) and no precipitation/aggregation of proteins was detectable.

In addition, the presence of hydrolyzed lambda carrageenan stabilized the color over storage of 3 and 6 weeks at 32° C. and a remaining sum of total blue absorbance of 74 to 84% and 61 to 79% was determined instead of 57% and 41% for the reference (example 1.3.1).

Example 5.1: Liquid Spirulina Extract-Hydrolyzed Lambda Carrageenan Composition

In one example lambda Carrageenan (Ticaloid® 750, Lot Number 41145 from TIC GUMS) was dissolved in demineralized water with a concentration of 4 wt %. To enable a fast dissolution of lambda carrageenan the water was tempered to 40° C. and the powder was incorporated via an Ultra-Turrax overhead stirrer. After cooling down the solution to ambient temperature (20° C.) the viscosity was determined to be 2100 mPas. To reduce the viscosity the pH was adjusted to pH 2.5 by adding citric acid and the solution was heated to 80° C. and kept at this temperature for 5 min. After cooling the solution to 20° C. a viscosity of 122 mPas was measured. To enable a homogeneous mixture with spirulina extract, the pH of the hydrolyzed carrageenan solution was increased to pH 5.9 by adding 0.2 M NaOH. Due to the addition of acids and base, the lambda carrageenan concentration decreased to 3.75 wt % and a viscosity of 103 mPas was detectable. To achieve a lambda carrageenan to phycocyanin ratio of 4.0 in the final composition, the treated lambda carrageenan solution was blended with a spirulina water extract with a phycocyanin concentration of 2.81 wt % in a ratio of 4 to 1. The mixture has a pH of 6.0 and was further blended with an invert sugar syrup (69.2° Bx). The ratio of sucrose syrup to spirulina extract-hydrolyzed lambda carrageenan solution was 1 to 3.3. The mixture was subsequent evaporated (rotary evaporator, Heidolph) at 28 mbar until a brix of 56° Bx was reached. The viscous liquid has a water content of 46.0 wt %.

In another example, lambda carrageenan powder (Ticaloid® 750, TIC GUMS) was added to tempered (77.5° C.) acidified water and stirred with an Ultra Turrax overhead stirrer at 600 rpm to enable a solution of the powder and simultaneous hydrolysis. The solution was stirred for 35 min at constant temperature (77.5° C.). The amount of citric acid to adjust pH 3.0 in the final 4 wt % lambda-carrageenan solution was evaluated prior to the hydrolysis in an individual experiment. The reaction was stopped by cooling the solution to 4° C. In an ice bath. The viscosity of the hydrolyzed carrageenan solution was 147 mPas. The pH was subsequent adjusted to 6.0 with 2M NaOH to enable a homogeneous carrageenan-spirulina extract mixture. Due to the addition of citric acid and alkaline solution the lambda carrageenan concentration decreased to 3.8 wt % and a viscosity of 156 mPas was observed. To achieve a lambda carrageenan to phycocyanin ratio of 4:1, the treated lambda carrageenan solution was blended with spirulina water extract with a phycocyanin concentration of 2.85 wt % in a ratio of 4 to 1. The mixture had a pH of 6.0 and was further blended with a sucrose syrup (69.0° Bx). The ratio of sucrose syrup to spirulina extract-hydrolyzed lambda carrageenan solution was 1 to 3.3. The mixture was subsequent evaporated (rotary evaporator, Heidolph) at 29 mbar until a brix of 52° Bx was reached. The viscos liquid has a water content of 47.6 wt %.

The phycocyanin content was determined to be 14.9 mg/ml and 16.7 mg/ml by the method of Yoshikawa and Belay (2008) and is given in table 13. The L*a*b* values were determined for the liquid composition, diluted in phosphate buffer (pH 7.0) to an absorbance of 1.0 at 620 nm.

TABLE 13

Phycocyanin content and L*a*b* values of a liquid spirulina extract lambda carrageenan composition

|  | Hydrolysis conditions of lambda carrageenan | Total phycocyanin [mg/ml] | L* | a* | b* |
|---|---|---|---|---|---|
| Liquid spirulina extract lambda carrageenan composition (56° Bx) | pH 2.5 80° C. 5 min | 14.9 | 71.45 | −19.35 | −38.95 |
| Liquid spirulina extract lambda carrageenan composition (52° Bx) | pH 3.0 77.5° C. 30 min | 16.7 | 71.13 | −20.19 | −39.07 |

Example 5.2: Color Stability of Liquid *Spirulina* Extract-Hydrolyzed Lambda Carrageenan Compositions in a Beverage Model System The liquid *spirulina*-extract-hydrolyzed lambda carrageenan compositions were added to a beverage model system (containing 7 wt % sucrose) prior to the pH adjustment. To get an initial phycocyanin content of 0.012 wt %, 0.79 and 0.72 wt % of the compositions were needed and citric acid was used to adjust the pH to 2.9.

Table 14 gives the L*a*b* values, the absorbance at 620, 650 and 667 nm as well as the calculated total sum of blue absorbance before and after thermal treatment of the beverage systems for both liquid *spirulina* extract-hydrolyzed lambda carrageenan compositions.

TABLE 14

Characteristics of a beverage system (pH 2.9) with liquid spirulina-extract lambda carrageenan compositions before and after thermal treatment

|  | Hydrolysis conditions | L* | a* | *b | A 620 nm-A 750 nm | A650 nm-A 750 nm | A667 nm-A 750 nm | Total sum of blue abs | % Total sum of blue abs |
|---|---|---|---|---|---|---|---|---|---|
| Beverage pH 2.9 with liquid spirulina extract hydrolyzed lambda carrageenan composition BH | pH 2.5 80° C. 5 min | 88.56 | −14.6 | −5.38 | 0.25716 | 0.26846 | 0.27086 | 0.79648 | 100.00 |
|  | pH 3.0 77.5° C. 35 min | 87.24 | −15.09 | −4.52 | 0.26937 | 0.28857 | 0.29427 | 0.85221 | 100.00 |
| Beverage pH 2.9 with liquid spirulina extract hydrolyzed lambda carrageenan composition AH | pH 2.5 80° C. 5 min | 86.65 | −13.63 | −3.86 | 0.24784 | 0.26744 | 0.26754 | 0.78282 | 98.28 |
|  | pH 3.0 77.5° C. 35 min | 84.08 | −14.75 | −3.1 | 0.27786 | 0.29916 | 0.29926 | 0.87628 | 102.82 |
| Beverage pH 2.9 with liquid spirulina extract hydrolyzed lambda carrageenan composition AH & 3 weeks storage at 90° F. | pH 2.5 80° C. 5 min | 87.7 | −11.51 | −4.05 | 0.21449 | 0.22339 | 0.22249 | 0.66037 | 82.91 |
|  | pH 3.0 77.5° C. 35 min | 89.82 | −12.43 | −6.75 | 0.22380 | 0.23480 | 0.23460 | 0.69320 | 81.34 |
| Beverage pH 2.9 with liquid spirulina extract hydrolyzed lambda carrageenan composition AH & 6 weeks storage at 90° F. | pH 2.5 min 80° C. 5 min | 86.59 | −9.03 | 0.79 | 0.17776 | 0.17706 | 0.17406 | 0.52888 | 66.40 |
|  | pH 3.0 77.5° C. 35 min | 88.67 | −10.78 | −4.64 | 0.20255 | 0.20405 | 0.20205 | 0.60865 | 71.42 |

BH: before heat-treatment,
AH: after heat-treatment

As can be seen from table 3 and 14 a change in the color hue is detectable in the presence of lambda carrageenan at acidic conditions. In addition, the absorbance curve shifts and a second absorbance maximum between 660 and 670 nm is detectable. Surprisingly the use of lambda carrageenan after a pH and heat treatment (hydrolysis) had the same protective effect as the untreated lambda carrageenan.

As measured by the total sum of blue absorbance, the presence of pH and heat-treated lambda carrageenan stabilized the color stability over the heat-treatment of the beverage system and only marginally loss of color (<2%) and no precipitation/aggregation of proteins was detectable. In addition, the loss of color (measured as the sum of blue absorbance) along storage was comparable to non-hydrolyzed carrageenan (see Table 4 & 5). Thus, it is assumed that the protective effect of multi-sulphated carrageenan does not depend on the polysaccharide chain length and multi-sulphated carrageenan can be used either in its non-degraded or hydrolyzed form.

What is claimed is:

1. A composition, comprising:
   a. a *spirulina*-extract comprising phycocyanin,
   b. at least one multi-sulphated carrageenan and
   c. water wherein the amount of the phycocyanin is between 0.5 and 50 wt % DM, wherein the amount of the at least one multi-sulphated carrageenan is between 1 and 80 wt % DM, wherein the amount of the water is between 0.1 and 60 wt %, wherein the wt % ratio of the at least one multi-sulphated carrageenan to the phycocyanin ranges between 1:1 and 20:1, wherein the composition comprises at least one chelating agent selected from the group consisting of ethylene diamine tetra acetic acid and/or its Na, K, Ca salts, D-gluconic acid and N,N-diacetic acid tetrasodium salt (GLDA), wherein the wt % DM are relative to the weight of the dry matter of the composition, and wherein wt % is relative to the total weight of the composition.

2. The composition according to claim 1, wherein the composition is a dry powder or granule, and the water content is between 0.1 and 15.0 wt % and wherein the phycocyanin content ranges between 1 and 50 wt %.

3. The composition according to claim 1, wherein the composition is a liquid and the water content ranges between 20.0 and 45.0 wt %, and wherein the phycocyanin content ranges between 1 and 15 wt %.

4. The composition according to claim 1, wherein the total phycocyanin content, which is the sum of the C-phycocyanin and allophycocyanin, in the composition ranges between 1 and 30 wt % DM.

5. The composition according to claim 1, wherein the at least ne multi-sulphated carrageenan is a non-degraded carrageenan.

6. The composition according to claim 1, wherein the at least one multi-sulphated carrageenan is a hydrolyzed carrageenan.

7. The composition according to claim 1, wherein the at least one multi-sulphated carrageenan are selected from the group consisting of ι-carrageenan and λ-carrageenan.

8. The composition according to claim 1, wherein the amount of at least one multi-sulphated carrageenan ranges between 5 and 70 wt % DM.

9. The composition according to claim 1, wherein the weight ratio between the at least one multi-sulphated carrageenan and the phycocyanin ranges between 2:1-15:1.

10. The composition according to claim 1, wherein the composition further contains other components, selected from carrier materials, sweeteners, other chelating agents, acids, salts, and other pigments.

11. The composition according to claim 1, wherein the ethylene diamine tetra acetic acid is present in an amount between 100-20000 ppm.

12. The composition according to claim 1, wherein the ethylene diamine tetra acetic acid and the phycocyanin are present within the composition at a weight ratio between 4:1-1:1000.

13. The composition according to claim 1, wherein the sum of the phycocyanin, the at least one multi-sulphated carrageenan and the water is at least 7 wt % of the total composition.

14. The composition according to claim 1, wherein the composition has a pH between 5 and 9.

15. A process for preparing the composition as defined in claim 1 comprising the following steps:
   a. aqueous extraction of phycocyanin from *Arthrospira platensis*, separation of undesired components from the extract and concentration of the extract to obtain the phycocyanin;
   b. dilution of the at least one multi-sulphated carrageenan until it occurs in dissolved form;
   c. blending the phycocyanin with the solution of the at least one multi-sulphated carrageenan to a weight ratio of the at least one multi-sulphated carrageenan to the phycocyanin between 1:1-20:1 at a pH of at least 5;
   d. adding the at least one chelating agent selected from the group consisting of ethylene diamine tetra acetic acid and/or its Na, K, Ca salts, D-gluconic acid and N N-diacetic acid tetrasodium salt (GLDA); and optionally other components selected from carrier materials, sweeteners, other chelating agents, acids, and other pigments; and
   e. removal of water by applying evaporation or a drying technique.

16. The process according to claim 15, wherein the drying technique is selected from the group consisting of freeze drying, drum drying and spray drying.

17. A foodstuff comprising between 0.001 and 50 wt % of the composition according to claim 1.

18. The composition according to claim 1, wherein the composition is a dry powder or granule, and the water content is between 3.0 and 12 wt %, and wherein the phycocyanin content ranges between 1.5 and 25 wt %.

* * * * *